United States Patent
Smith et al.

(10) Patent No.: US 6,616,377 B1
(45) Date of Patent: Sep. 9, 2003

(54) DEVICE FOR JOINING TUNNEL SEGMENTS

(75) Inventors: Christopher R. Smith, Tamworth (GB); Peter F. Robertshaw, Nuneaton (GB)

(73) Assignee: Bosworth Plastics Limited, Hinckley (GB)

( * ) Notice: Subject to any disclaimer, the term of this patent is extended or adjusted under 35 U.S.C. 154(b) by 0 days.

(21) Appl. No.: 10/097,384

(22) Filed: Mar. 15, 2002

(51) Int. Cl.[7] ............................................... E21D 11/00
(52) U.S. Cl. ...................................... 405/135; 405/153
(58) Field of Search ............................... 405/153, 152, 405/157, 150.1, 177, 135, 134

(56) References Cited

U.S. PATENT DOCUMENTS

| | | | |
|---|---|---|---|
| 4,477,204 A | * 10/1984 | Rohde et al. | 405/153 |
| 4,830,536 A | * 5/1989 | Birch et al. | 405/153 |
| 5,549,416 A | * 8/1996 | Thomas et al. | 405/153 |

FOREIGN PATENT DOCUMENTS

| | | | |
|---|---|---|---|
| EP | 0 317 220 | * 5/1989 | |
| EP | 0 651 135 A2 | 10/1994 | |
| EP | 0 955 448 A1 | 11/1999 | |

* cited by examiner

*Primary Examiner*—Heather Shackelford
*Assistant Examiner*—Frederick Lagman
(74) *Attorney, Agent, or Firm*—Birch, Stewart, Kolasch & Birch, LLP

(57) ABSTRACT

A coupler device for joining together two segments of a tunnel or shaft lining ring, the device being characterised by a double ended male dowel having an externally grooved cylindrical portion adjacent to both ends. This dowel engages in recesses cast into the segment. A reverse tapered sleeve is cast in the recesses retaining an expandable collar formed of a plurality of arcuate segments, these arctuate segments having complimentary grooves on their inner surface to mate with the grooves on the dowel and a tapered external circumferential portion to abut the reverse tapered sleeve. As the dowel is inserted the arcuate segments, being retained elastically within the reverse tapered sleeve, lock the male part of the device into the recess preventing the device from pulling out.

24 Claims, 5 Drawing Sheets

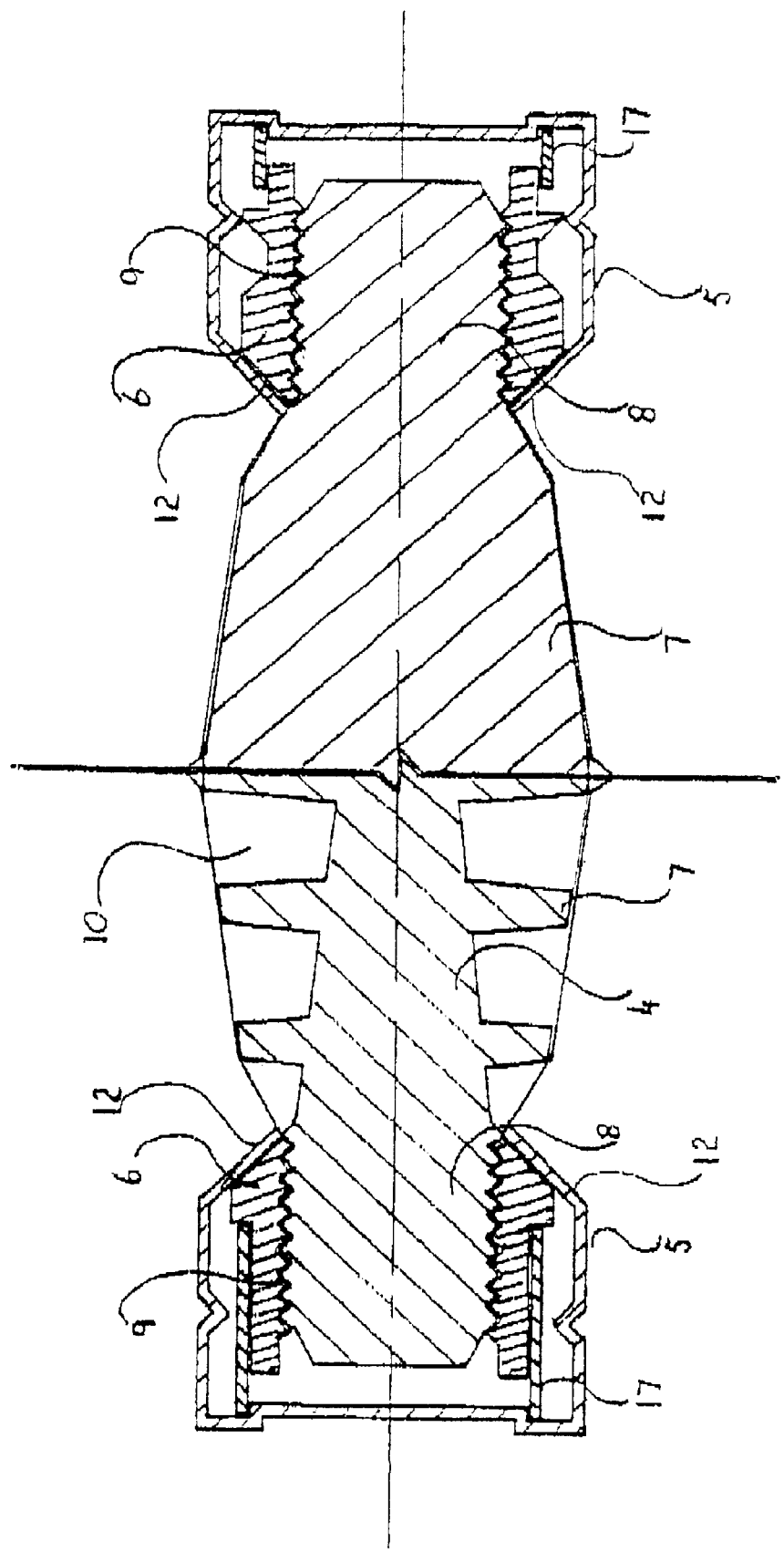

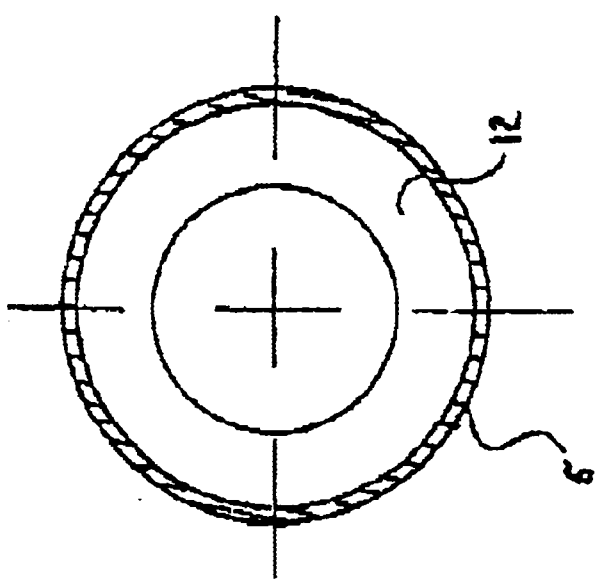
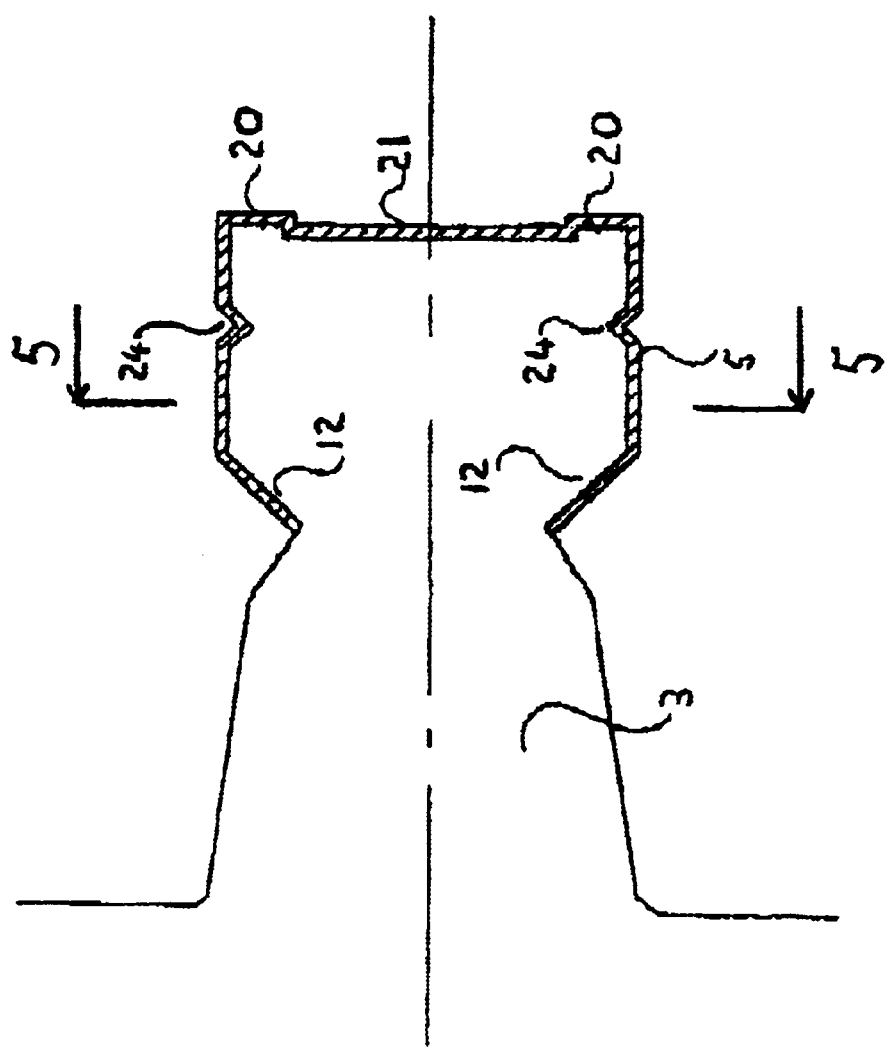

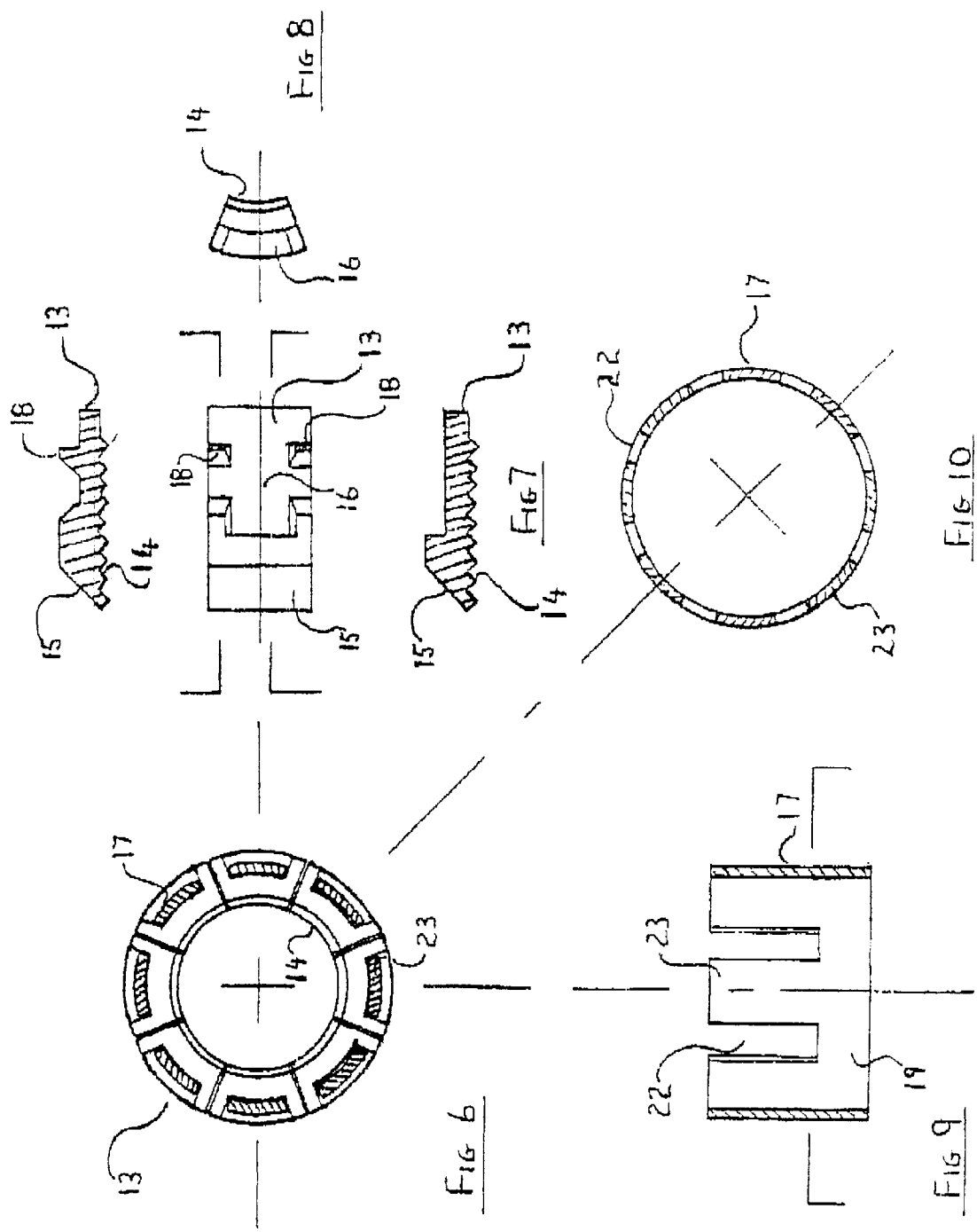

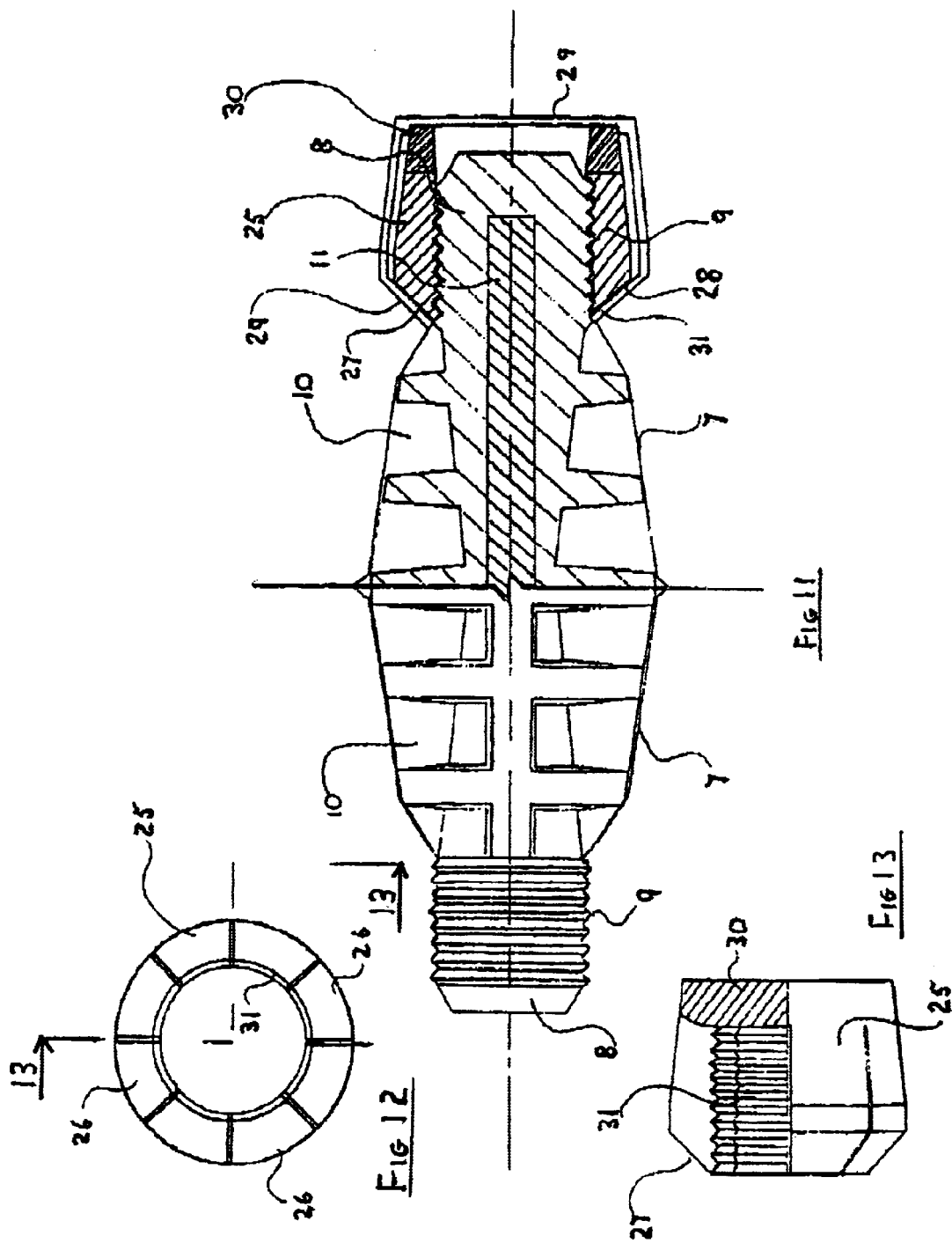

DEVICE FOR JOINING TUNNEL SEGMENTS

BACKGROUND OF THE INVENTION

This invention relates to a coupler device for joining two tunnel lining segments together.

DESCRIPTION OF THE PRIOR ART

Previous inventions disclose devices, which align and restrain two tunnel lining segments of a ring. However they are limited by the accuracy of their manufacture or the accuracy of the casting of the tunnel lining segment. In all cases the joining device is inserted prior to the segments being pushed together by rams and relies on geometric interference to provide restraint.

SUMMARY OF THE INVENTION

According to the present invention there is provided a coupler device for joining together two construction segments of a construction member selected from the group comprising a tunnel lining ring, shaft lining and the like, the coupler device comprising a double ended male first part having a substantially cylindrical portion adjacent to both ends, each substantially cylindrical portion having a surface which is formed into a series of grooves, a second part incorporating a reverse tapered sleeve for retention in one of the construction segments and a third part having an expandable collar formed of a plurality of arcuate segments, said arcuate segments having complementary grooves on their inner surface to mate with the cylindrical portion of said first part and a tapered external circumferential portion to abut the reverse tapered sleeve of said second part, said arcuate segments being retained elastically within the second part.

The arcuate segments maybe retained by a membrane of elastically flexible material.

In use, as two tunnel lining segments are urged together with the male part engaged in the recesses in both segments the cylindrical grooved portion adjacent to both ends of the device abuts the internally grooved arcuate segments retained in the sleeve at the base of the recesses cast in the segments, forcing back and radially outwards the expandable collar formed by the arcuate segments.

The movement of the expandable collar is resisted elastically which forces the mating grooves around the internal surfaces of the ring of arcuate segments to engage the cylindrical grooved portion of the male part of the device.

The tapered external surfaces of the ring of arcuate segments engage the surrounding reverse tapered sleeve thus locking the male part of the device into the recess formed in the sides of the segments preventing the device from pulling out.

When segments are urged together it is to be expected that the abutting faces of the tunnel rings do not fully contact one another. The relationship between the grooved cylindrical portion adjacent to both ends of the male part of device and the expandable collar formed by the arcuate segments is so arranged as to start the expandable collar engaging the grooved cylindrical portion of the male part of the device and the tapered external surfaces of the ring of arcuate segments engaging the surrounding reverse tapered sleeve prior to fully closing the gap between the adjacent segments.

When segments are urged together it is to be expected that the abutting faces of the tunnel rings do not initially fully align one to the other. The relationship between the expandable collar formed by the arcuate segments and the abutting surface of the surrounding reverse tapered sleeve is so arranged as to allow each arcuate segment of the expandable collar to individually engage the grooved cylindrical portion of the male part of the device prior to full alignment between the adjacent segments.

The significant advantage gained from this invention is that the restraint does not rely on geometric interference. The highly accurate dimensions of the recesses in the segments and the extremely tight tolerances required when forming the existing devices are not necessary. This means that the device is easier to use, easier to manufacture and more practical.

The segments may be made of concrete.

The central male portion of the device may be made of plastic or similar material to provide the necessary strength and durability.

The central male portion of the device may incorporate additional strengthening inserts of other material along its length.

The central male portion of the device may be double conical in shape to assist in aligning the tunnel segments.

The arcuate segments forming the expandable collar may be identical and formed from plastic or similar material to provide the necessary strength and durability.

The arcuate segments forming the expandable collar may be integral at their base with an elastic ring formed from plastic or similar material to provide the necessary strength and durability.

The expandable collar may be formed of any number of arcuate segments.

The expandable collar may be retained within an elastic membrane which may be formed from plastic or similar material to provide the necessary strength and durability.

The external surface of the central male portion of the device may be serrated or recessed.

The external surface of the cylindrical ends of the central male portion of the device may incorporate a series of grooves or recesses.

The grooves or recesses around the external surface of the cylindrical ends of the central male portion of the device may be individual concentric rings or threads or discrete recesses.

The grooves around the internal surface of the arcuate segments forming the expandable collar of the device may be individual concentric rings or threads or discrete recesses in order to mate with the grooves around the external surfaces of the central male portion of the device to maximising the locking forces between the central male portion and the expandable collar.

The external surface of the arcuate segments orming the expandable collar includes a reverse tapered portion to assist in locking the central male core into the recesses.

The external surface of the arcuate segments forming the expandable collar may have ridges or recesses to assist in maintaining its alignment with the external sleeve.

The internal surface of the external sleeve may have ridges or recesses to assist in maintaining the alignment of the arcuate segments forming the expandable collar.

BRIEF DESCRIPTION OF THE DRAWINGS

The invention is described by way of example with reference to the following drawings.

FIG. 3 is a longitudinal side view of the coupler device according to one embodiment of this invention;

FIG. 4 is a longitudinal section of the recess formed in the tunnel lining and the external sleeve of the coupler device according to one embodiment of this invention;

FIG. 5 is a sectional view of the external sleeve of the coupler device according to one embodiment of this invention;

FIG. 6 is a cross sectional view of the ring of arcuate segments forming the expandable collar and the retaining elastic membrane of the coupler device according to one embodiment of this invention;

FIG. 7 is a plan view of the extrados of an individual arcuate segment from the expandable collar with two part sections through the individual arcuate segment according to one embodiment of this invention;

FIG. 8 is an end view of a separate annular segment forming the expandable collar according to one embodiment of this invention;

FIG. 9 is a longitudinal section of the elastic membrane that retains the expandable collar of the coupler device according to one embodiment of this invention;

FIG. 10 is a cross sectional view of the elastic membrane that retains the expandable collar of the coupler device according to one embodiment of this invention;

FIG. 11 is a part longitudinal section and side view of the male part of the coupler device engaged within the expandable collar according to a second embodiment of this invention;

FIG. 12 is a cross sectional view of the ring of arcuate segments forming the expandable collar of the coupler device according to a second embodiment of this invention; and FIG. 13 is a part longitudinal section and side view of the expandable collar device according to a second embodiment of this invention.

DESCRIPTION OF THE PREFERRED EMBODIMENTS

It is to be understood that wherever reference is made in this specification to a tunnel lining, the present coupler devices are also intended to be used with lining segments for shafts and the like.

Figure 1:
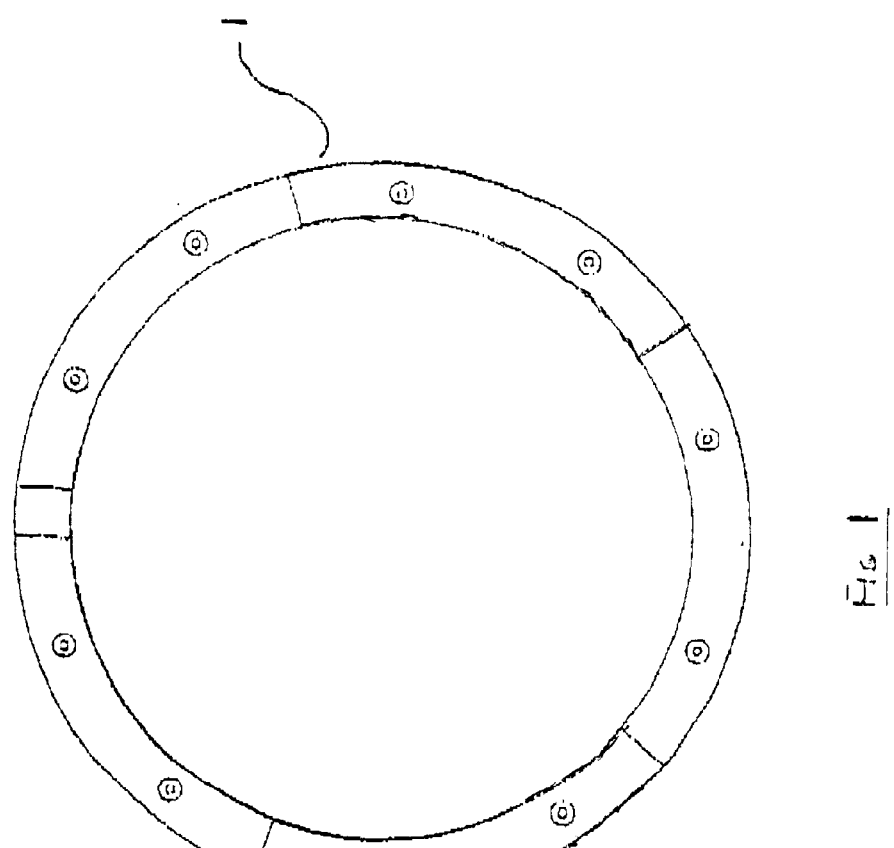
FIG. 1 diagrammatically illustrates an end view of a typical concrete tunnel lining ring made up of a plurality of tunnel lining segments.
Figure 2:
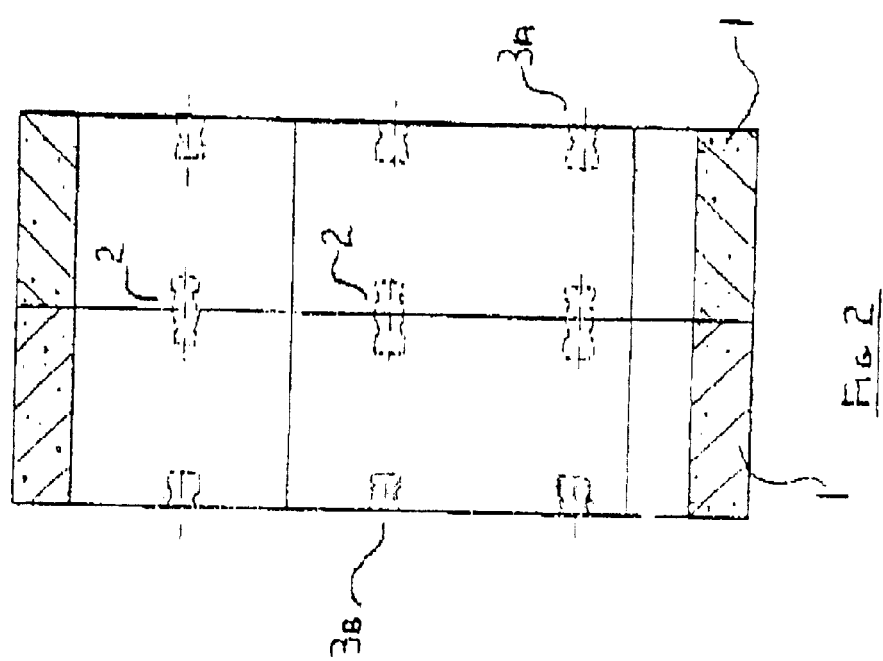
FIG. 2 is a diagrammatic sectional side view of two adjacent rings joined together with coupler devices according to this invention.

Referring to FIGS. 1 to 10 of the drawings, a tunnel lining ring is typically made up of plurality of concrete lining segments 1 joined to one another. Once a ring has been fitted in place in the tunnel, the next ring can be urged towards the first ring by rams, either as a complete ring or one segment at a time, and automatically joined to it by coupler devices 2.

The coupler devices 2 consist of a male part 4 which engage in symmetrical recesses 3A and 3B formed in the abutting faces of the segments. A reverse tapered sleeve 5 incorporating the expandable collar 6 is fixed at the base of each recess 3.

Each male part 4 of the device 2 has a central double conical core 7 which acts as a dowel, and a cylindrical end portion 8 adjacent to the central double conical part of the core 7. The external surface of the cylindrical end portion 8 having grooves 9 around its circumference.

The central double conical part of the core 7 assists in the alignment between segments and incorporates recesses 10 to provide a limited amount of flexibility without reducing the shear and tensile capacity of the device.

Longitudinally along the centre of the male part of the device 4 there may be a strengthening rod 11 of another material totally encased within the male part of the device 4.

Encased at the ends of recesses 3 there is an external sleeve 5 of the device which has a reverse tapered portion 12 encasing the expandable collar 6 engaging on the reverse tapered portion 12 of the external sleeve 5.

The expandable collar 6 consists of a plurality of arcuate wedges 13, the inner surface of the arcuate wedges 13 having a number of ridges 14 so shaped as to mate with the grooves 9 around the external surface of the cylindrical ends 8 of the central male part of the device 4.

According to one embodiment of this invention the external surface of each arcuate wedge 13 incorporates a tapered portion 15 engaging on the reverse tapered portion 12 of the external sleeve 5, and a groove 16 locating the surrounding elastic membrane 17. The external surface of each arcuate wedge 13 may incorporate a ridge 18 to abut against the external sleeve 5 assisting in the alignment of the arcuate wedges 13.

Around the outer circumference of the ring of arcuate segmental wedges 13 there is a cylindrical flexible elastic membrane 17. The elastic membrane 17 incorporates a skirt 19 that locates in a recess 20 in the base 21 of the external sleeve 5, a number of slots 22 and a number of fingers 23 that locate in the grooves 16 in the external surface of each of the arcuate wedges 13.

The external sleeve 5 may incorporate a ridge or recess 24 to engage the ridge 18 formed on the external circumferential surface of the arcuate wedges 13 to assist in the alignment of the arcuate wedges 13.

In another embodiment of the invention shown in FIGS. 11 to 13 the expandable collar 25 consists of a ring of arcuate wedges 26. The inner surface of the arcuate wedges 26 having a number of ridges 31 so shaped as to mate with the grooves 9 around the external surface of the cylindrical ends 8 of the central male part of the device 4.

The external surface of the ring of arcuate wedge 26 incorporates a tapered portion 27 engaging on the reverse tapered portion 28 of the external sleeve 29. The ring of arcuate wedges 26 is retained by an integral elastic cylinder 30 which forces the ring of arcuate wedges 26 to engage with the grooves 9 around the external surface of the cylindrical ends 8 of the central male part of the device 4. The base of the elastic cylinder 30 abuts against the external sleeve 29 assisting in the alignment of the expandable collar 25.

We claim:

1. A coupler device for joining together two construction segments of a construction member selected from the group comprising a tunnel lining ring and shaft lining, the coupler device comprising a double ended male first part having a substantially cylindrical portion adjacent to both ends, each substantially cylindrical portion having a surface which is formed into a series of grooves, a second part incorporating a reverse tapered sleeve for retention in one of the construction segments and a third part having an expandable collar formed of a plurality of arcuate segments, said arcuate segments having complementary grooves on their inner surface to mate with the cylindrical portion of said first part and a tapered external circumferential portion to abut the reverse tapered sleeve of said second part, said arcuate segments being retained elastically within the second part.

2. A device according to claim 1, wherein the arcuate segments are retained by a membrane of elastically flexible material.

3. A device according to claim 1, wherein the relationship between the grooved cylindrical portion adjacent to both ends of the male first part of the device and the expandable collar formed by the arcuate segments is so arranged as to start the expandable collar engaging the grooved cylindrical portion of the male first part of the device and the tapered external surfaces of the ring of arcuate segments engaging the surrounding reverse tapered sleeve as the segments are urged, in use of the device, together and prior to fully closing the gap between the adjacent tunnel lining segments.

4. A device according to claim 1, wherein the relationship between the expandable collar formed by the arcuate segments and the abutting surface of the surrounding reverse tapered sleeve is so arranged as to allow, in use, each arcuate segment of the expandable collar to individually engage the grooved cylindrical portion of the first male part of the device prior to full alignment between the adjacent tunnel lining segments.

5. A device according to claim 1, wherein the male first part is made from a material selected from the group comprising plastic and similar material.

6. A device according to claim 5, wherein the male first part incorporates additional strengthening inserts of material other than plastic or similar material along its length.

7. A device according to claim 1, wherein the male first part is double conical in shape to assist in aligning the construction segments.

8. A device according to claim 1, wherein the arcuate segments forming the expandable collar are formed of material selected from the group comprising plastic and similar material.

9. A device according to claim 1, wherein the arcuate segments forming the expandable collar are identical.

10. A device according to claim 8, wherein the arcuate segments forming the expandable collar are formed in to an integral base with an elastic ring formed from plastics and similar material.

11. A device according to claim 1, wherein the expandable collar is retained within an elastic membrane.

12. A device according to claim 11, wherein the expandable collar is formed from material selected from the group comprising plastics and similar material.

13. A device according to claim 1, wherein the external surface of the male first part is serrated.

14. A device according to claim 1, wherein the external surface of the male first part is recessed.

15. A device according to claim 1, wherein the external surface of the cylindrical ends of the male first part incorporate a series of profiles selected from the group comprising grooves and recesses.

16. A device according to claim 15, wherein the profiles around the external surface of the cylindrical ends of the male first part are selected from the group comprising individual concentric rings, threads and discrete recesses.

17. A device according to claim 1, wherein the grooves around the internal surface of the arcuate segments forming the expandable collar are selected from the group comprising individual concentric rings, threads and discrete recesses in order to mate with the grooves around the external surfaces of the male first part.

18. A device according to claim 1, wherein the external surface of the arcuate segments forming the expandable collar includes a reverse tapered portion to assist in locking the male first part into the tunnel lining segments.

19. A device according to claim 1, wherein the external surface of the arcuate segments forming the expandable collar have profiles selected from the group comprising ridges and recesses, to assist in maintaining the alignment of the collar with the sleeve.

20. A device according to claim 1, wherein the internal surface of the sleeve has profiles selected from the group comprising ridges and recesses to assist in maintaining the alignment of the arcuate segments forming the expandable collar.

21. Two tunnel lining segments joined by a coupler device comprising a double ended male first part having a substantially cylindrical portion adjacent to both ends, each substantially cylindrical portion having a surface which is formed into a series of grooves, a second part incorporating a reverse tapered sleeve retained in the tunnel lining segments and a third part having an expandable collar formed of a plurality of arcuate segments, said arcuate segments having complementary grooves on their inner surface to mate with the cylindrical portion of said first part and a tapered external circumferential portion to abut the reverse tapered sleeve of said second part, said arcuate segments being retained elastically within the second part.

22. Two tunnel lining segments according to claim 21, wherein the tunnel lining segments are of concrete.

23. Two segments of a shaft lining joined by a coupler device comprising a double ended male first part having a substantially cylindrical portion adjacent to both ends, each substantially cylindrical portion having a surface which is formed into a series of grooves, a second part incorporating a reverse tapered sleeve retained in the shaft lining segments and a third part having an expandable collar formed of a plurality of arcuate segments, said arcuate segments having complementary grooves on their inner surface to mate with the cylindrical portion of said first part and a tapered external circumferential portion to abut the reverse tapered sleeve of said second part, said arcuate segments being retained elastically within the second part.

24. Two segments of a shaft lining according to claim 23, wherein the shaft lining segments are of concrete.

\* \* \* \* \*